US006518395B1

(12) United States Patent
Klostermann et al.

(10) Patent No.: US 6,518,395 B1
(45) Date of Patent: Feb. 11, 2003

(54) METHOD FOR PRODUCING REACTIVE COATING POWDER COMPOSITIONS

(75) Inventors: Peter Klostermann, Wuppertal (DE); Karin Maag, Inzlingen (DE); Dietrich Saatweber, Wuppertal (DE); Hans-Ulrich Simmrock, Düsseldorf (DE); Eckard Weidner, Bochum (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/554,458

(22) PCT Filed: Oct. 29, 1998

(86) PCT No.: PCT/EP98/06862

§ 371 (c)(1),
(2), (4) Date: Aug. 1, 2000

(87) PCT Pub. No.: WO99/24493

PCT Pub. Date: May 20, 1999

(30) Foreign Application Priority Data

Nov. 12, 1997 (DE) .......................................... 197 49 989

(51) Int. Cl.$^7$ .............................. C08F 6/00; B05D 1/02
(52) U.S. Cl. ...................... 528/501; 528/483; 528/490; 528/491; 528/492; 528/493; 528/494; 528/495; 528/502; 523/340; 427/422
(58) Field of Search .................. 528/483, 502 E, 528/502, 501, 490, 491, 492, 493, 494, 495; 523/340; 427/422

(56) References Cited

U.S. PATENT DOCUMENTS 5,981,696 A * 11/1999 Saatweber et al. ... 427/385.5 X

FOREIGN PATENT DOCUMENTS

| WO | WO 85/00993 | 3/1985 |
| WO | WO 92/00342 | 1/1992 |
| WO | WO 94/09913 | 5/1994 |
| WO | WO 95/21688 | 9/1995 |

* cited by examiner

*Primary Examiner*—Fred Teskin
(74) *Attorney, Agent, or Firm*—Steven C. Benjamin

(57) ABSTRACT

Process for preparation powder coating formulations by pressure release of a composition comprising a low molecular mass inert compound, with release of the low molecular mass inert compound, in which process one or more base resins and one or more hardeners for the base resins, or one or more self-curing base resins, and, if desired, further customary coatings components, are converted together or separately into a flowable form by heating, the low molecular mass inert compound is dissolved under pressure at least in one of the base resin or hardener components employed, either before these components are combined with the other components or in the already prepared mixture, the overall mixture is homogenized, and then the mixture of all components is released from pressure, with cooling.

22 Claims, 2 Drawing Sheets

METHOD FOR PRODUCING REACTIVE COATING POWDER COMPOSITIONS

BACKGROUND OF THE INVENTION

Figure 1:
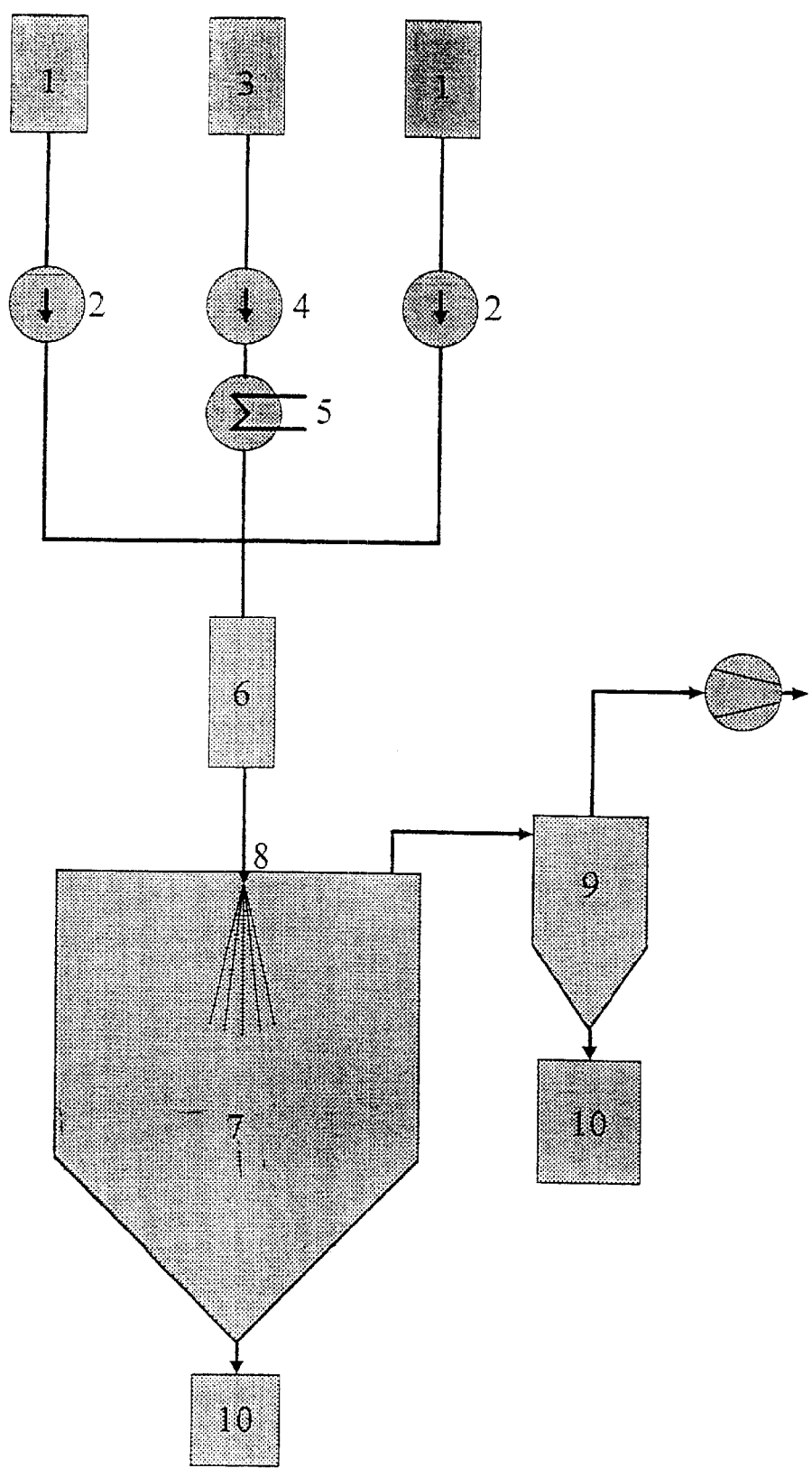

The invention relates to a preparation process for pulverulent coating materials using a low molecular mass inert compound as auxiliary.

Of the large number of known powder coating preparation processes, the processes which find particularly broad application are those in which the ready-formulated powder coating material is extruded in the form of a pastelike melt and is brought to the desired particle size, after cooling of the melt and coarse comminution, by fine milling and subsequent sieving. The following process steps in particular are common for coloured powder coating materials:

1. The constituents of the powder coating material are subjected to thorough initial mixing in dry form as solids in the required proportions.

2. The mixture is melted in an extruder at a very low temperature in order to avoid premature cross-linking, and is thoroughly mixed. In the course of this mixing, binder and hardener are plasticized and wet the pigments and fillers.

1. The optionally coloured extrudate obtained is rolled out into a thin layer, cooled and crushed to give coarse granules.

2. The granules are milled in a mill to give the finished powder coating material.

In general, the unavoidable fine fraction <10 $\mu$m in the milling process is removed in a subsequent screening process. The resulting powder typically has a mean particle size of from 40 to 70 $\mu$m.

(Compare Ullmanns Enzyklopädie der technischen Chemie, Volume 15, page 680, 1978, Verlag Chemie Weinheim, and the monograph "The Science of powder coatings" Volume 1 and 2 (Editor D. A. Bate, London 1990)). In the case of these processes there may be difficulties and/or laborious subsequent operations, especially in regard to the extrusion and milling procedures. In the case of highly reactive binder mixtures, the extrusion procedure may take place too slowly so that partial gelling occurs, which no longer permits use of the product for coatings. Limiting the residence time in the extruder, on the other hand, results in non-optimum dispersion of the pigments in the binder. In carrying out coating with powder coating material, this poor dispersion leads to a relatively poor hiding power which has to be compensated by a relatively high proportion of pigments. The extrusion step also imposes a limitation in respect of the binders that can be employed, since it is possible to operate only within a certain viscosity range. For example, newly developed crystalline resins, which above the melting point possess a very low melt viscosity and give rise to outstanding powder coating materials, cannot be processed in an extruder. The use of mixtures of resins having very different viscosities is also of only limited feasibility in an extruder, owing to the poor homogenization of such systems. The broad particle size spectrum which forms in the course of milling is in the range, for example, of from 0.1 to 500 $\mu$m and requires additional sieving and milling procedures for specific applications. The fines which are produced, moreover, are disadvantageous for both health and processing reasons.

Also known are processes for preparing powder coating materials, in which powder coating melts are sprayed (DE-A-22 33 138, EP-A-0 537 233). The melting of the base resin and hardener components may lead to thermal stressing of the powder coating composition. Reducing the contact time between base resin and hardener in the melted state is possible only at great technical expense.

It is also known to employ low molecular mass inert compounds in the form of compressible fluids as auxiliaries for the preparation of powders and powder coating materials. Thus in accordance with EP-A0 157 827, WO 95/34606 and EP-A-0 720 999 the components of the powder coating composition are dissolved in a supercritical fluid and the resulting solution is sprayed with pressure release.

Cooling induced by the procedure of pressure release causes the formation of the powder particles. This pressure release can be carried out spontaneously or as a function of time, continuously or in stages. It is possible to obtain particle sizes of from 5 to 150 $\mu$m, but also very fine particles in the range from 1 to 5 $\mu$m or less, by using appropriate nozzles.

A disadvantage of these processes is that the concerned components are in many cases of only slight solubility in supercritical fluids. High pressures and large amounts of gas are necessary in order to dissolve the solids in the supercritical fluid.

EP-A-0 669 858 and EP-A-0 661 091 relate to preparation processes for coating powders, in which the solid starting substances are intended to be insoluble in the supercritical fluid under process conditions. One of the purposes of this is to avoid losses due to transportation of starting material out of the pressure release vessel. According to EP-A-0 669 858, the solid starting substances are mixed homogeneously in the supercritical fluid and then this mixture is relieved of its pressure, whereas in accordance with EP-A0 666 091 the powder components are melted and the liquid material is dispersed in an appropriate fluid.

With processes of this kind there may be problems in terms of the homogeneity of the mixtures.

Also known are processes in which powder preparation takes place from solvent-containing compositions, using compressible fluids, by pressure release of the solution and simultaneous evaporation of the solvent, examples being EP-A-0 711 586 and JP 8-104 830. The solvents used should be partially miscible with the solid components and should have a high volatility rate.

The use of organic solvents and the efforts involved in recovering these solvents render these processes disadvantageous.

To avoid high pressures and amounts of gas, and also the use of organic solvent and the associated expenditure for its recovery, a process has been developed, in accordance with WO 95/21688, in which the compressible fluid is dissolved under pressure in the substance mixture that is to be treated and then the solution is relieved of its pressure. For this purpose, the solid components are melted and an appropriate fluid is dissolved under pressure therein.

This process relates to the preparation of particles and powders, examples being starting materials for the production of emulsifiers and detergents, and also pharmaceutical active ingredients. Where mixtures of different substances are processed by this process, these mixtures are first of all prepared and then inserted into the process. The preparation of reactive powder coating materials is not addressed. A mixture of different powder coating components comprising base resins, hardeners and pigments/fillers and also further coatings additives may lead to unwanted chemical reactions between base resin and hardener which influence the properties of the powder coating compositions unsuccessfully.

The object of the invention is to provide a process which makes it possible to prepare powder coatings continuously or batchwise and in a simple manner while avoiding strong thermal stress. Furthermore the object of the present invention is the preparation of homogeneous powder coating formulations by spraying of gas containing melts without premature chemical reaction between the powder coating components. The process is intended to yield homogeneous powder coating particles with an adjustable mean particle size in the range from 10 to 80 μm and with a narrow particle size distribution and to permit the use of raw materials within a wide viscosity range. In addition, the processing of powder coating compositions with a low crosslinking temperature should be possible. At the same time, the laborious removal of solvents and the use of high pressures, in comparison with conventional processes, is to be avoided.

SUMMARY OF THE INVENTION

It has been found that this object can be achieved by the process which forms the subject of the invention, namely a process for preparing powder coating formulations by pressure release of a composition comprising a low molecular mass inert compound, with release of the low molecular mass inert compound as a gas or vapour, which is characterized in that one or more base resins and one or more hardeners for the base resins, or one or more self-curing base resins, and, if desired, further conventional coatings components, such as additives and, in the case of coloured powder coating materials, pigments, dyes and, if desired, fillers are converted together or separately into a flowable form by heating, the low molecular mass inert compound is dissolved under pressure at least in one of the base resin or hardener components employed, either before these components are combined with the other components or in the already prepared mixture, the complete mixture is homogenized, and then the mixture of all components is released from pressure, with cooling and formation of a powder having a mean particle size of between 10 and 200 μm and a narrow particle size distribution.

DETAILED DESCRIPTION OF THE INVENTION

In the process of the invention the components, especially base resin and hardener, can be brought into a flowable form separately from one another by heating. This procedure avoids a premature crosslinking reaction. Pigments, fillers and additives can be converted to a flowable melt as a mixture with base resin or hardener component. It is suitably, that these components are mixed with the binder, since in many cases the hardener is employed in relatively small amounts. However, it is also possible to carry out initial mixing of pigments, fillers and additives with the hardener component. The separate liquefaction of base resin and hardener leads to a very short contact time in the mixer section of the process, which contributes to a substantial reduction of any premature crosslinking reaction.

The supply of the low molecular mass inert compound prior to or simultaneously with the operation of mixing hardener and base resin components takes place under conditions such that the said compound is dissolved under pressure, at least partially, in the mixture or in at least one of the components of the mixture. In the course of the subsequent pressure release, the low molecular mass inert compound is released and the mixture falls below the solidification temperature of the powder coating formulation. The simultaneous increase in volume of the low molecular mass inert compound leads to the formation of essentially spherical particles which have a narrow particle size distribution and which can then be isolated.

In the case of particularly highly reactive substances especially, the process of the invention can be varied by supplying the low molecular mass inert compound under pressure prior to the mixing of the individual components before and/or during the melting of the individual components.

In particular it is possible, in the case of powder coating compositions in which base resin and hardener component have a very different viscosity, to dissolve the low molecular mass inert compound in one of the starting components, such as the base resin, for example, and then to mix this solution with the second component.

This process variant makes it possible on the one hand to reduce the temperature required for heating this component, in that the melt viscosity is reduced and the mixing operation can be carried out at a lower temperature. This is of advantage in the case of thermally highly reactive systems. Alternatively it is possible in this way to reduce the viscosity of the component prior to mixing. This is of great importance in particular in the case of powder coating systems with very different viscosities of base resin and hardener components, since in these systems homogeneous mixing of these components in the conventional powder coating preparation process is difficult. In the process of the invention it is possible to bring into line the viscosity of both components by first of all dissolving the inert low molecular mass component in the component of higher viscosity and being able thus to adapt the viscosity prior to the mixing operation. This leads to better homogenization in the subsequent mixing operation and gives rise to a powder coating having improved service properties.

The mixing operation required in the process of the invention can proceed such that, for example, the base resin and hardener components which form the powder coating composition, and any additives, pigments and fillers, are mixed in a static mixer with simultaneous addition of the inert low molecular mass compound. A further possibility is to mix the base resin and hardener components, with or without the addition of additives, in a static mixer after the separate dissolution of the inert compound in the respective component.

In one variant of the process it is also possible briefly to melt the complete powder coating mixture, consisting of base resin(s), hardener(s), additives, any pigments and fillers, in an extruder, and then to dissolve the inert low molecular mass compound in the mixture under pressure. This can be done using again, for example, a static mixer, which permits better dispersion of the pigments in the powder coating mixture. In the case of this variant, the residence time in the extruder, in order to avoid premature reaction, is preferably less than 5 minutes.

Another variant of the process exists in that portions of powder coating waste, especially powder coating overspray from the spraying process, are transported to the powder coating components and to the, if necessary, additives, pigments and/or extenders before or during their mixing with one another and/or with the low molecular mass inert compound and are manufactured together with the named components in accordance with the invention by pressure release, with cooling.

According to a further embodiment of the invention base resin and hardener component can be employed as powder coating overspray or powder coating overspray mixtures. As base resin and hardener powder coating overspray or powder coating overspray mixtures having different compostioins can be used.

The low molecular mass compound which is inert towards base resin and hardener components is added to the powder coating components, before or after they are mixed, under pressure and temperature conditions which lie above or below the critical pressure and the critical temperature of a low molecular mass gaseous compound, so as to give a pressurized solution of the low molecular mass coinpound in the initial charge of substance or substance mixture. This operation may occupy, for example, an average period of time in the range from 0.1 seconds to 5 minutes, preferably 1 second to 1 minute, more preferably less than 1 minute, in particular less than 30 seconds.

The mixture, which is preferably saturated with the low molecular mass compound, is relieved of its pressure rapidly in an appropriate pressure release device. In accordance with the invention, pressures and temperatures in the mixer are established such that the inert compound is released in the course of the pressure release operation and brings about cooling to such an extent that it is possible to fall below the solidification temperature of the powder coating formulation that is to be treated. The powder coating formulation is solidified. Owing to the great increase in volume on the release of the inert compound, the solidified powder coating formulation is obtained as a fine powder. After the particles have been separated off, they can if desired be fractionated.

The mass ratio between the low molecular mass compound and the powder coating formulation or the individual components in this case is preferably between 0.05:1 and 8:1, with particular preference between 0.1:1 and 2:1 and, in particular, between 0.2:1 end 1:1.

So that, in the course of pressure release, the substance mixture at least reaches and preferably falls below its solidification temperature, which in the case of powder coatings is usually between 25 and 70° C., it is advantageous if certain pressure and temperature conditions exist prior to the pressure release operation.

The solidification temperature adopted is the glass transition temperature of the mixture under atmospheric pressure, which can be determined with the aid of differential scanning calorimetry (DSC). Since the glass transition temperature is lowered by the dissolution of the inert low molecular mass compound in accordance with the invention, it is also possible to spray the mixture at below the solidification temperature. Differential scanning calorimetry (DSC) can be carried out, for example, as described in Schwarzl, Polymermechanik 1990, page 273.

A preferred temperature range is the range down to 20° C. below and up to 100° C. above the solidification under atmospheric temperature.

The selection of a suitable inert compound takes place judiciously after having determined the solidification temperature of the substance mixture at atmospheric pressure and the resulting temperature range for the operation of the mixer. Examples of suitable inert compounds in this context are low molecular mass compounds which are soluble in at least one component of the powder coating formulation and which within the temperature range for the operation of the mixer have reduced temperatures of from 0.5 to 2, preferably from 0.7 to 1.7. The reduced temperature is the ratio of the temperature at which the mixture is operated to the critical temperature of the inert low molecular mass compound in [K]. The pressure under which the mixing operation is carried out is preferably between 0.5 MPa and 60 MPa, with particular preference between 0.1 MPa and 35 MPa and, in particular, between 0.3 MPa and 20 MPa.

As inert compound it is possible in principle to use any inert low molecular mass substance or any substance mixture, especially if it meets the above conditions regarding the reduced temperature and the absolute pressure at the operating temperature of the mixer and is soluble in at least one component of the powder coating formulation.

Preferred examples of low molecular mass compounds which are inert towards base resin and hardener components are carbon dioxide, dinitrogen oxide, ammonia, nitrogen, noble gases, sulphur hexafluoride, halogenated hydrocarbons such as, for example, chlorotrifluoromethane, monofluoromethane, trifluoromonofluoroethane, trifluoromethane, alkanes, such as methane, ethane, propane, n-butane, i-butane, n-pentane and i-pentane, for example, alkenes, such as ethene, propene and butene, for example, ethers, such as dimethyl ether and diethyl ether, for example, amines, such as dimethylamine, for example, alcohols, such as methanol, ethanol and isopropanol, ketones, such as acetone, methyl ethyl ketone and methyl isopropyl ketone, esters, such as ethyl acetate, and also mixtures of these.

With particular preference carbon dioxide is employed.

For a powder coating formulation with a solidification temperature under atmospheric pressure of 45° C. it is possible, for example, at a mixer temperature of 80° C. to operate with carbon dioxide (critical temperature: 304.3 K, reduced temperature at mixer temperature 1.16). For a powder coating formulation having a solidification temperature under atmospheric pressure of 65° C. it is possible at a mixer temperature of 150° C. to employ methanol (critical temperature: 313.65 K, critical pressure 7.89 MPa, reduced temperature at mixer temperature: 0.82) as inert compound.

A static mixer is preferably employed for mixing the individual components of the powder coating formulation and the inert, low molecular mass component. The temperature of this mixer can preferably be regulated. Alternatively, the formation of a homogeneous mixture can also be achieved with stirring or shaking devices or any other device serving for homogenization, for example an ultrasound source or a rotor-stator apparatus. Furthermore, homogeneous mixtures can also be produced by appropriate flow guidance, for example by means of tangential flows, jet flows in accordance with the water jet principle, or by impact flow. The mixing action can be improved by means of superimposed pressure pulsations.

Subsequent pressure release, for example to atmospheric pressure, can take place in various ways. The pressure can, for example, be released spontaneously within a very small period of time, for example in a nozzle, or pressure release is carried out as a function of time within the pressure vessel, for example in a period between a few seconds and a number of hours. If necessary, the solution can be freed by filtration, prior to pressure release, from mechanical impurities originated from the powder coating overspray, for example, which do not dissolve in the inert compound. Filtration can be carried out discontinuously, for example by way of sieves, cloths, filter fibres or sinter plates or, preferably, continuously by way of, for example, in-line cartridge filters.

Spontaneous pressure release of the solution or mixture of powder coating formulation and inert compound can take place, for example, by spraying into an environment which is preferably at atmospheric pressure. The intention here is to cool the formed powder particles below their glass transition temperature/solidification temperature, which can take place, for example, using the evaporation enthalpy of the liquefied or supercritical inert compound.

It is likewise possible to choose the environmental temperature to be below the glass transition temperature of the powder coating composition. This can be achieved by indirect cooling of the spraying vessel or by direct cooling. In the case of direct cooling, the spraying vessel can be cooled by introducing gases, or liquid gases, in the form of jets. The cooling medium can in this case be applied in the area of the pressure release device, at the lid, at the base or at the wall or walls of the spraying vessel.

Spraying can take place by means of a spraying device connected to the pressure vessel, examples being a fan nozzle, solid-cone nozzle, hollow-cone nozzle, dual-substance nozzle, orifice plate, capillary, manual or automatic valve, nozzle/baffle plate system or a rotating disc or a rotary bell. Spraying is preferably carried out vertically.

The separation of the formed particles from the gas stream takes place in a known manner by means, for example, of a cyclone. In accordance with the invention, the resulting powders can be used directly without further treatment as powder coating material.

If desired, the particles can be separated by subsequent sieving, for example over metal meshes, into a particle size class suitable for a particular application.

Through a suitable choice of the process parameters such as temperature, pressure, flow rate, nozzle type, nozzle diameter, viscosity, concentration of the pressurized solution, for example, it is possible to influence the particle size of the powder coating particles. The particles generally have a diameter of from 1 to 150 $\mu$m. Particle sizes from 1 to 100 $\mu$m are preferred, with particular preference being given to a mean particle size below 50 $\mu$m.

The process of the invention can also be carried out directly, in the form of a powder coating process. In this case the above-described spraying of the pressurized solution takes place directly in the direction of a substrate that is to be coated. Following atomization, the formed powder coating particles cool down to below their glass transition temperature before impinging on the substrate surface. After coating, the powder coating particles are caused to melt, flow and, if appropriate, to crosslink.

In accordance with the process of the invention it is possible to process all thermosetting or else all thermoplastic powder coating compositions in which the selected, low molecular mass inert compounds are soluble under suitable pressure and temperature conditions.

By base resin is meant the film-forming component of a powder coating material. Suitable examples are base resins which are customary and are employed for powder coating materials and mixtures of these resins, examples being polyester resins, (meth)acrylic copolymers, epoxy resins, phenolic resins, polyurethane resins and siloxane resins. The base resins possess, for example, glass transition temperatures of from 30 to 120° C., preferably less than 80° C., and, for example, number-average molar masses (Mn) of from 500 to 20,000, preferably less than 10,000. It is also possible to employ unsaturated resins, which are suitable, for example, for radiation-curing systems. Crystallizable and semicrystalline polymers can also be employed, for example.

As hardener components it is possible to employ hardeners which are familiar to the man skilled in the art for the base resin component, examples being amines, phenolic resins, polyfunctional oligomeric epoxides, low molecular mass polyfunctional epoxides such as triglycidyl isocyanurate, for example, and hydroxyalkylamides. For radiation-curing systems it is also possible to employ customary initiators.

The hardener components possess, for example, number-average molar masses (Mn) of from 100 to 10,000, preferably less than 2000.

The selection of the base resins and hardeners depends on the functional groups that react with one another, and is familiar to the man skilled in the art. In this context it is possible, if desired, to combine various reactive groups with one another. The base resins and hardeners can on average contain at least two functional groups per molecule. The weight ratio of base resin to hardener is in general, for example, from 98:2 to 50:50. It can preferably be between 95:5 and 70:30.

It is possible for two or more base resins and two or more hardeners to be present in the mixture.

As additives it is possible to mix in the customary powder coating additives, examples being levelling agents, devolatilizing agents, antioxidants, light stabilizers, matting agents, adhesion promoters, lubricants, catalysts, rheology-controlling agents, and additives for adjusting the surface structure of the coating.

The process of the invention is suitable for the preparation of both coloured and transparent powder coating materials. To produce coloured powder coating materials it is possible to employ all organic or inorganic pigments and dyes which are known to the man skilled in the art. By adding fillers such as barium sulphate or calcium carbonate, for example, it is possible to raise the hiding power of the coating and to modify the mechanical and optical properties. The good dispersing of the pigments and/or fillers in accordance with the invention leads to coloured powders of excellent hiding power.

The powder coating materials prepared in accordance with the invention can be employed, for example, as anti-corrision coating materials as a decorative industrial coating, for example in the field of facing coatings, office furniture, electrical equipment and automotive accessories. The layer thickness of the coating can be, for example, between 15 and 200 $\mu$m. The process of the invention offers considerable advantages in particular for coatings <50 $\mu$m, which are difficult to realize with conventional powder coating materials since it permits the preparation of powders having a mean particle size <40 $\mu$m, which are necessary in order to achieve these low coating thicknesses and lend themselves excellently to processing by the methods customary for powder coating materials. The powder coating materials prepared in accordance with the invention are likewise suitable as fillers or a coat for resistance to falling stones, and as basecoats or topcoats. The powder coating materials prepared in accordance with the invention are also employed as transparent powder coating materials for example in the automotive sector and, for example, with coating thicknesses of from 30 to 150 $\mu$m.

The powder coating material prepared in accordance with the invention is applied by customary powder coating application techniques, examples being spray application, sintering techniques (such as triboelectric spraying, ESTA-assisted spraying, ESTA-assisted fluidized-bed sintering, and strip coating processes).

The process of the invention makes it possible to prepare powder coating materials simply. Joint temperature-stressing melting of base resin and hardener components and extrusion can be avoided. With the process of the invention, homogeneous and finely divided powder coating mixtures can be prepared without laborious milling processes. This is achieved by virtue of the homogeneity of the mixture of powder coating components that can be obtained with the process of the invention, and by the narrow particle size distribution that is achievable, and the morphology similar to a sphere of the resulting powder coating particles.

A particular advantage of the process is that the low molecular mass inert compound can be supplied before and/or during the melting of the individual components. In this way there is only very slight temperature stressing of base resin and hardener components. The process enables, furthermore, the contact time between base resin and hardener components during the mixing operation to be reduced substantially, so avoiding premature reaction of the individual components with one another, especially in the case of highly reactive powder coating components.

The process allows for the use of raw materials which vary greatly in viscosity, and the possibility of predispersing pigments and/or fillers in the resin without side reactions.

The attached figures show exemplary embodiments of the process of the invention.

In accordance with the example depicted in FIG. 1, the binder component(s) and the hardener component(s) are separately melted and thermally conditioned each in a separate reservoir vessel (1), with or without the admixing of the additives, pigments, fillers into one or both reservoir vessels. The separately melted components are supplied by pump devices (2) to the mixing point. Passed to the mixing point at the same time is the inert compound, which from a reservoir (3) is compressed by a compressor device (4) and then supplied to the mixing point. In addition, a heat exchanger (5) is fitted for the temperature regulation of the inert compound. Downstream of the mixing point is a preferably temperature-regulatable mixer (6) in which the homogeneous mixture is produced. After passing through the mixer (6) the solution/mixture passes, for spraying, into a pressure release device (8), for example a high-pressure nozzle, valve, capillary, or orifice plate, which is integrated in the head of a spraying tower (7). In order to avoid a drop in pressure in the mixer (6) during the spraying operation, inert compound and the individual components of the powder coating formulation are metered in continuously. In the course of pressure release the inert compound escapes as a gas and the coating composition that is to be powdered separates out in the form of solid particles.

The dimensions of the spray tower (7) are such that particles having an equivalent diameter of >100 $\mu$m are deposited preferentially by sedimentation. The particles are collected in a discharge vessel (10) or can be discharged continuously with an appropriate device. The gas stream which has been freed from the relatively large particles leaves the spraying tower (7) at the top end and is supplied to a cyclone (9). The dimensions of the cyclone are such that particles having a size of more than 1 $\mu$m are deposited preferentially. The particles are collected in a discharge vessel (10) which is mounted at the lower end of the cyclone, or are discharged continuously from this vessel using an appropriate device (lock, screw, fluidized bed with overflow, etc). Particles having a size below 1 $\mu$m can be filtered out of the gas stream leaving the cyclone (9) with the aid of a fine filter, for example an electrofilter. The inert compound can be recovered and supplied again to the reservoir vessel (3).

Figure 2:
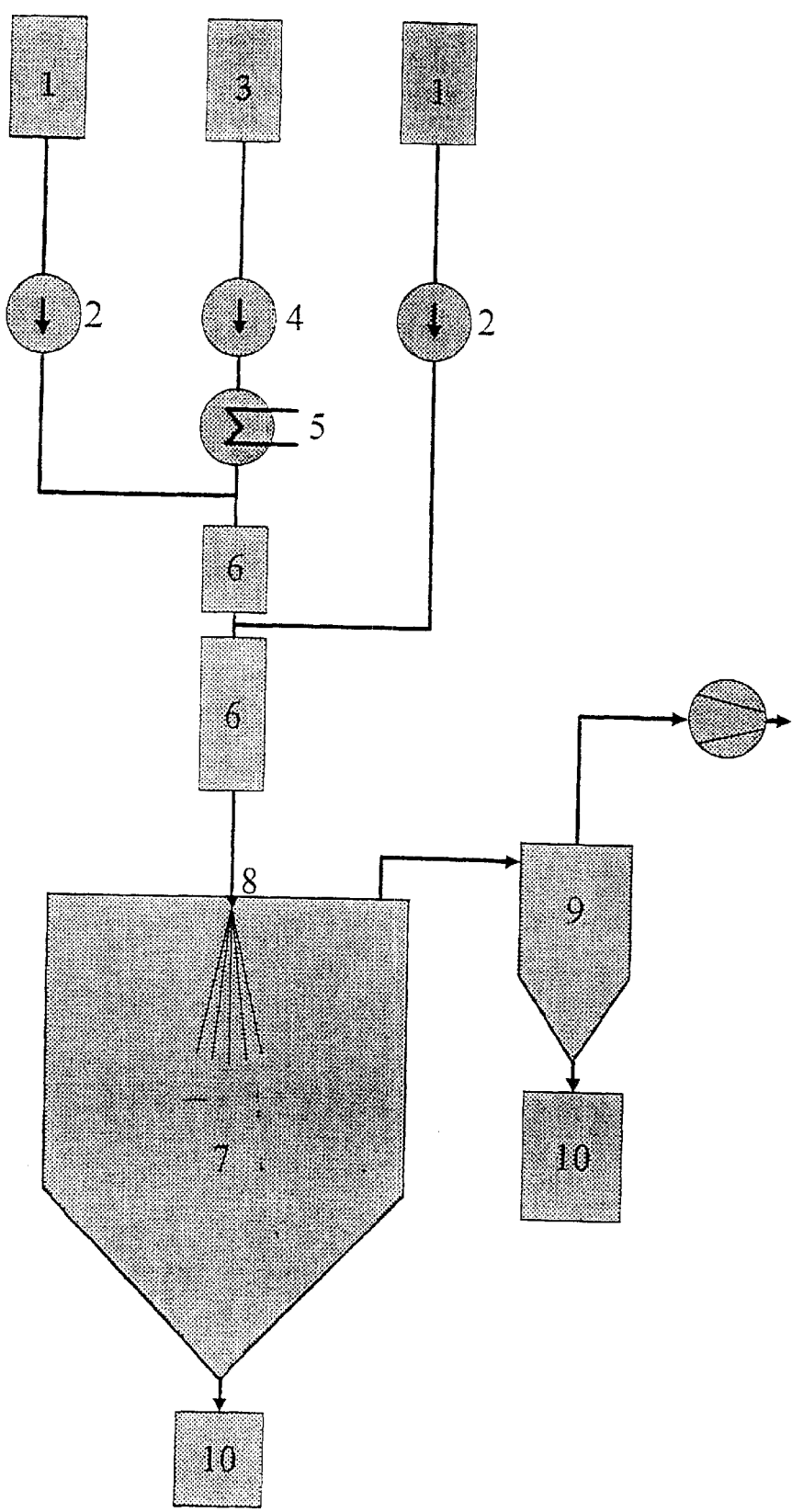

A further exemplary embodiment of the process is shown in FIG. 2. This embodiment differs from the embodiment shown in FIG. 1 in that one of the two reactive components is first of all brought into contact with the inert compound from the reservoir vessel (3) in a mixer (6). Preferably, the component(s) of the powder coating formulation having the higher viscosity are initially mixed with the inert compound. The solution/mixture of inert compound and relevant powder coating component(s) may have a considerably lower viscosity than that of the pure powder coating component(s). The further component(s) of the powder coating formulation, to which inert compound may have been added if desired, are subsequently added to this mixture/solution at a further mixing point, and are thoroughly mixed in a mixer (6). Examples of this variant are the simpler thorough mixing and further reduction in the contact time of the reactive powder coating components during the mixing and/or dissolving operation. In addition it is thereby possible to avoid melting of the relevant powder component(s). The addition of a further component is not at all ruled out. Pressure release, particle formation, separation, fractionation by particle size, and particle discharge are no different from the embodiment shown in FIG. 1.

EXAMPLE 1

In a unit corresponding to FIG. 1, 20 kg of a glycidyl methacrylate copolymer customary for the preparation of powder coating materials are charged as a melt at a temperature of 136° C. to a reservoir vessel. 5 kg of Additol VXL 1381 (anhydride hardener) as hardener component are charged as a melt at a temperature of 10° C. to a further reservoir vessel. The two components are supplied by metering pumps to a static mixer (type SMX, from Sulzer, length 200 mm). The mass flow of the binder is 10 kg/h and that of the hardener is 2 kg/h. In the static mixer, carbon dioxide is added to the powder coating formulation and is at least partially dissolved. The temperature of the carbon dioxide is chosen so that the temperature in the static mixer is 105° C. The solidification temperature of the powder coating mixture is determined by differential thermal analysis as 87° C. The pressure is 110 bar. The mass flow of the carbon dioxide is 7 kg/h. After the mixture has passed through the static mixer, pressure release takes place in a customary commercial high-pressure nozzle with an outlet diameter of 0.8 mm. The nozzle is integrated into the lid of a spray tower. The temperature in the spray tower in the course of the spraying operation is 39° C. That is clearly below the solidification temperature of 87° C. of the produced powder coating formulation. The carbon dioxide liberated in the course of pressure release is drawn off by suction using a fan, together with the fine fraction of the powder that has formed, and is passed through a cyclone. The gas drawn off by suction from the cyclone is passed through an ultrafine filter paper before passing through the suction fan.

After a spraying time of 45 minutes, a total of 10 kg of a pulverulent powder coating formulation are withdrawn from the spraying tower (1 kg), the cyclone (8.95 kg) and the ultrafine filter (about 50 g). The main fraction obtained from the cyclone has a mean particle size of 22 $\mu$m. This product is applied to a steel panel by the ESTA technique in a coating device. After curing at 130° C., a firmly adhering, homogeneous coating having a mean coat thickness of 35 $\mu$m is obtained.

EXAMPLE 2

In a unit corresponding to FIG. 2, 20 kg of a glycidyl methacrylate copolymer customary for the preparation of powder coating materials are charged as a melt at a temperature of 136° C. to a reservoir vessel. 5 kg of Additol VXL 1381 as hardener component are charged as a melt at a temperature of 100° C. to a further reservoir vessel. The binder is supplied with a metering pump to a first static mixer (tylde SMX, from Sulzer, length 70 mm). The mass flow of the binder is 10 kg/h. In the first static mixer, carbon dioxide as inert compound is admixed with the binder and at least partially dissolved. After passing through the first static mixer, the hardener component is added with a mass flow of 2 kg/h to the solution/mixture of binder and inert compound, which now has a low viscosity, and the resulting mixture is mixed thoroughly in a second static mixer (type SMX, from Sulzer, length 200 mm). The temperature in this mixer is 123° C. The pressure is 105 bar. The mass flow of the carbon dioxide is 8.2 kg/h. The temperature in the spray tower is 44° C. After a spraying time of 30 minutes 0.75 kg of a pulverulent powder coating formulation is withdrawn from the spray tower, 5.23 kg from the cyclone and 0.02 kg from the ultrafine filter. The mean particle size of the main fraction recovered from the cyclone is 34 $\mu$m. The properties of the coating film produced with this product are no different from those in Example 1.

What is claimed is:

1. A process for preparing a reactive powder coating composition which comprises the steps of:
  a) placing at least one base resin component and at least one hardener component into separate containers, wherein said base resin component and said hardener component are each separately converted into a flowable melt by being heated;
  b) mixing the flowable melt base resin and the flowable melt hardener components of step (a) to form a flowable melt mixture;
  c) mixing under pressure a low molecular mass inert compound with the flowable melt mixture of step (b) to form a pressurized mixture;
  d) homogenizing the pressurized mixture formed in step (c) for a period ranging from 0.1 seconds to 5 minutes to form a homogenized mixture; and
  e) depressurizing the homogenized mixture formed in step (d), wherein said depressurization releases the low molecular mass inert compound from said homogenized mixture and further wherein said depressurization cools the homogenized mixture.

2. A process for preparing a reactive powder coating composition which comprises the steps of:
  a) converting at least one self-curing resin component into a flowable melt by heating said self-curing resin component;
  b) mixing under pressure a low molecular mass inert compound with the flowable melt of step (a) to form a pressurized mixture;
  c) homogenizing the pressurized mixture formed in step (b) for a period ranging from 0.1 seconds to 5 minutes to form a homogenized mixture; and
  d) depressurizing the homogenized mixture formed in step (c), wherein said depressurization releases the low molecular mass inert compound from said homogenized mixture and further wherein said depressurization cools the homogenized mixture.

3. The process according to claim 1 wherein the base resin component and the hardener component are combined prior to being converted into the flowable melt of step (a).

4. The process according to claim 1 wherein at least one pigment, at least one filler, and at least one additive are mixed with the base resin component, wherein said pigment, filler, and additive are mixed with the base resin component before said base resin component is converted into the flowable melt of step (a).

5. The process according to claim 1 wherein at least one pigment, at least one filler, and at least one additive are mixed with the hardener component, wherein said pigment, filler, and additive are mixed with the hardener component before said hardener component is converted into the flowable melt of step (a).

6. The process according to claim 1 wherein the low molecular mass inert compound is selected from the group consisting of carbon dioxide, dinitrogen oxide, ammonia, nitrogen, noble gases, sulphur hexafluoride, halogenated hydrocarbons, alkanes, alkenes, ethers, amines, alcohols, ketones, esters, and mixtures thereof.

7. The process according to claim 1 wherein the low molecular mass inert compound is mixed under pressure with the flowable melt base resin component to form a pressurized basin resin component mixture, wherein said pressurized base resin component mixture is mixed under pressure in step (b) with the flowable melt hardener component to form the pressurized mixture of step (c).

8. The process according to claim 1 wherein the low molecular mass inert compound is mixed under pressure with the flowable melt hardener component to form a pressurized hardener component mixture, wherein said pressurized hardener component mixture is mixed under pressure in step (b) with the flowable melt base resin component to form the pressurized mixture of step (c).

9. The process according to claim 1 wherein the low molecular mass inert compound and the flowable melt mixture of step (c) have a mass ratio ranging from 0.05:1 to 8:1.

10. The process according to claim 2 wherein the low molecular mass inert compound and the flowable melt of step (b) have a mass ratio ranging from 0.05:1 to 8:1.

11. The process according to claim 1 wherein the base resin components and the hardener components have a mass ratio ranging from 98:2 to 50:50.

12. The process according to claim 1 wherein the low molecular mass inert compound is mixed with the flowable melt mixture in step (c) at a temperature ranging from 20 K below to 100 K above the flowable melt mixture's solidification temperature at atmospheric pressure.

13. The process according to claim 1 wherein the low molecular mass inert compound is mixed with the flowable melt mixture in step (c) at a pressure ranging from 0.5 MPa to 60 MPa.

14. The process according to claim 1 wherein the homogenization in step (d) takes less than 1 minute.

15. The process according to claim 7 wherein the flowable melt base resin component has a higher viscosity than the flowable melt hardener component.

16. The process according to claim 8 wherein the flowable melt hardener component has a higher viscosity than the flowable melt base resin component.

17. The process according to claim 1 wherein the base resin components are selected from the group consisting of polyester resins, (meth)acrylic copolymers, epoxy resins, phenolic resins, polyurethane resins, and siloxane resins.

18. The process according to claim 17 wherein the base resin components are crystallizable or semicrystalline.

19. The process according to claim 1 wherein the base resin components and the hardener components are comprised of powder coating overspray.

20. The process according to claim 1 wherein the low molecular mass inert compound is carbon dioxide.

21. A powder coating process comprising the steps of:
  a) placing at least one base resin component and at least one hardener component into separate containers, wherein said base resin component and said hardener component are each separately converted into a flowable melt by being heated;
  b) mixing the flowable melt base resin and the flowable melt hardener components of step (a) to form a flowable melt mixture;

c) mixing under pressure a low molecular mass inert compound with the flowable melt mixture of step (b) to form a pressurized mixture; and d) spraying the pressurized mixture formed in step (c) directly onto a substrate.

22. The process according to claim 21 wherein the base resin component and the hardener component of steps (a) and (b) comprise a self-curing resin.

* * * * *